3,212,965
METHOD OF CONTROLLING NEMATODE INFESTATIONS
Lester N. Stanley, Delmar, N.Y., Charles F. Jelinek, Easton, Pa., and William H. Armento, Albany, N.Y., assignors to General Aniline & Film Corporation, New York, N.Y., a corporation of Delaware
No Drawing. Filed Nov. 16, 1960, Ser. No. 69,551
12 Claims. (Cl. 167—32)

This invention relates to methods of controlling nematode infestations.

Nematodes in soil attack the roots of plants and are thus responsible for huge annual losses to agriculture. Much effort has been expended in seeking effective means for controlling this pest.

The use of toxicants is a preferred method, and generally involves the fumigation of the soil with volatile compounds, inoculation of the soil with relatively stable compounds, or the direct treatment of the roots of infested plants.

However, while a given compound may perhaps be toxic to nematodes, to be useful as an agricultural pesticide it must also be non-injurious to plant life in nematocidal concentrations.

It is an important object of this invention to provide novel compositions which are non-toxic to plants in concentrations effective to control nematode infestations of soil and roots.

Another object is the provision of an improved method for controlling infestations by nematodes through the use of such compositions.

Other objects of this invention will appear from the following detailed description.

In accordance with the present invention, it has been discovered that compounds belonging to any one of the three general classes shown below will effectively control nematode infestations in concentrations which are not herbicidal or otherwise phytotoxic.

These three classes may be represented by the following general formulae:

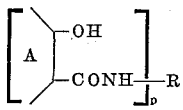

I and
$R_1(COCH_2CONHR_2)_n$  II $(R_3COCH_2CONH)_2R_4$  III

In the above formulas, A represents the moiety necessary to complete a carbocyclic or heterocyclic ring system; R represents an aryl group; $R_1$ is alkyl or aryl; $R_2$ is an aryl or heterocyclic radical; $R_3$ is alkyl or aryl; $R_4$ is aryl; and $n$ and $p$ each represents 1 or 2.

Typical compounds failing within Class I, which may be made by the processes of U.S. Patents 1,762,474 and 1,890,201, include:

3-hydroxy-2-naphthanilide
2-hydroxy-3' and 4'-nitro-2-naphthanilide
3-hydroxy-2-naphth-o, m and p-anisidide
2-hydroxy-2',5'-dimethoxy-2-naphthanilide
3-hydroxy-4'-chloro-2',5'-dimethoxy-2-naphthanilide
3-hydroxy-2-naphth-p-phenetidide
Bis(3-hydroxy-2-naphtho)dianisidide
3-hydroxy-3', and 4'-chloro-2-naphthanilide
3-hydroxy-3,5'-dichloro-2-naphthanilide
3-hydroxy-3'-cyano-2-naphthanilide
3-hydroxy-2-naphtho-o, m and p-toluidide
3-hydroxy-3' and 5'-chloro-2-naphtho-o-toluidide
3-hydroxy-4'-methoxy-2-naphtho-o-toluidide
3-hydroxy-2',4',2',5' and 3',5'-dimethyl-2-naphthanilide
3-hydroxy-N-(1 and 2-naphthyl)-2-naphthamide
3-hydroxy-N-(5,6,7,8-tetrahydro-1 and 2-naphthyl)-2-naphthamide
3-hydroxy-N-(3-methoxy-2-dibenzofuryl)-2-naphthamide
3-hydroxy-2-anthra-o, m and p-toluidide
2-hydroxy-2', 3', and 4'-chloro-3-carbazolecarboxanilide
2-hydroxy-4'-methoxy-11H - benzo [a] carbazole - 3 - carboxanilide
2-hydroxy-11H-benzo [a] carbazole-3-carbox-p-anisidide Typical compounds falling within Class II, which may be made by the processes of U.S. Patents 1,982,675 and 1,985,556 where $n=1$ and U.S. Patent 1,971,409 where $n=2$, include:

4'-chloro-2',5'-dimethoxyacetoacetanilide
5'-chloro-2',4'-dimethoxyacetoacetanilide
4'-benzamido-2',5'-dimethoxybenzoylacetanilide
N-naphthylacetoacetamide
4'-chloro-6'methyl-m-acetoacetanisidide
5'-methyl-o-acetoacetanisidide
o- and p-acetoacetotoluidide
Terephthaloylbis(aceto-o and p-toluidide)
Terephthaloylbis(5'-chloro-2',4'-dimethoxyacetanilide)
2-acetoacetamido-6-ethoxybenzothiazole

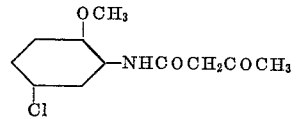

Typical compounds falling within Class III, which may be made by the processes of U.S. Patents 1,594,864 and 2,152,786, include:

Bisacetoacetobenzidide
Bisacetoacetodi-o-toluidide
Bisacetoacetodi-o-anisidide

The compounds represented by the above formulae may also contain solubilizing groups such as, for example, —$SO_3H$, —COOH, and additional —OH radicals.

The method for demonstrating the effectiveness of the compounds consists in fumigating a brei of heavily infested roots of tomato plants in moist sand for 24 hours prior to suspending the sample on a 100-mesh stainless steel screen in an adequate amount of water.

More particularly, the effectiveness of each of the compounds in the examples set forth in the table below was tested according to the following method:

Duplicate 100 gram samples of dry sand were mixed with 5 gram samples of a brei of tomato roots infested with the root-knot nematode, *Meloidogyne incognita*. The brei itself was prepared by cutting roots of infested tomato plants into quarter-inch lengths and then further macerating in a Waring Blendor for one minute. The sand and brei were mechanically mixed by shaking for one minute in a closed Mason jar. After shaking, the mixture was transferred to 2¼ inch clay pots and 50 mg. of the test chemical was added. Each pot was then wrapped in Saran and allowed to stand for 24 hours.

After standing for 24 hours the mixture was transferred to 100 mesh wire cloth stainless steel cylindrical screens approximately 2½ inches high and 3½ inches in diameter. These screens were placed in the bottom half of a 9 cm. Petri dish containing 25 ml. of water and were covered with the Petri dish cover. After standing a while the mixture had absorbed the water from the plate, so an additional 10 ml. of distilled water was added to each plate in order that free water would be available.

In the case of fumigant chemicals microscopic counts were made of the living nematodes which had migrated through the screen into the Petri dish. However, in the case of non-fumigant chemicals, the latter may not make adequate contact with the nematodes until after the water had been added. For this reason, the microscopic counts were made 48 hours after the mixture was transferred to the screen. An effective water-soluble nonfumigant chemical may let nematodes pass the screen, but it would immobilize the nematodes in the Petri dish.

The effectiveness of the chemicals was measured by the number of living nematodes found in at least 10 fields; or 150 nematodes were counted per dish.

Each test was run in duplicate. Where a chemical showed nematocidal action, further tests were made at successive half strengths to determine the minimum effective concentration or the point at which control ceased.

As stated previously, to be useful as a nematocide for agricultural purposes, the chemical must also be non-phytotoxic. Accordingly, the compounds were also tested for their effect on seed germination, systemic toxicity, and defoliation.

The results of tests on representative members of the three general classes defined above are given in the following table:

| Example | Compound | No. of Dead Nematodes | No. of Living Nematodes |
|---|---|---|---|
| 1 | 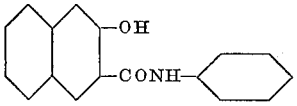<br>3-hydroxy-2-naphthanilide | 31 | 7 |
| 2 | 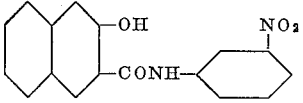<br>3-hydroxy-3'-nitro-2-naphthanilide | 29 | 6 |
| 3 | 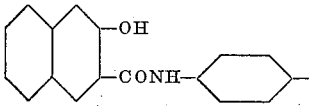<br>3-hydroxy-4'-chloro-2-naphthanilide | 30 | 5 |
| 4 | 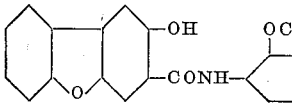<br>3-hydroxy-2',5'-dimethoxy-2-dibenzofurylanilide | 23 | 4 |
| 5 | 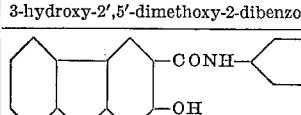<br>2-hydroxy-4'-chloro-3-carbazolecarboxanilide | 43 | 9 |
| 6 | 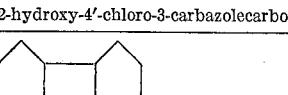<br>2-hydroxy-11H-benzo[a]carbazole-3-carbox-p-anisidide | 51 | 0 |
| 7 | 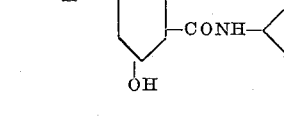<br>Bisacetoacetodi-o-anisidide | 33 | 8 |
| 8 | 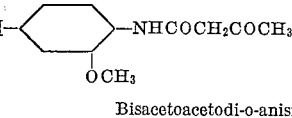<br>3-hydroxy-2-anthra-o-toluidide | 23 | 6 |

| Example | Compound | No. of Dead Nematodes | No. of Living Nematodes |
|---|---|---|---|
| 9 | 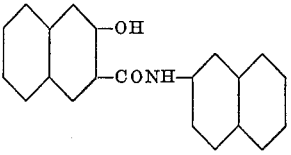 3-hydroxy-N-(2-naphthyl)-2-naphthamide | 36 | 11 |

Phytotoxicity tests on radishes, rye grass and soy beans indicated that none of the compounds tested were phytotoxic to these plants.

For actual field use the nematocides of this invention can be applied by any one of several conventional procedures. Thus, the toxicants can be applied to the soil in water solution, as a suspension, mixed with an inert diluent such as talc; or they can be applied directly to the roots of plants in the vehicles previously mentioned. In either procedure, the object is to cause the pests to be brought into intimate contact with the toxicant.

It is to be understood that the foregoing detailed description is given merely by way of illustration and that many variations may be made therein without departing from the spirit of this invention.

What is claimed is:

1. The method of controlling nematode infestations which comprises contacting the nematodes with a toxicant selected from the group consisting of

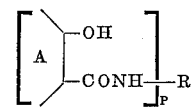

and $(R_3COCH_2CONH)_2R_4$ wherein A represents the moiety necessary to complete a member of the group consisting of naphthalene, anthracene, dibenzofurane and carbazole ring systems, R is a member of the group consisting of phenyl, naphthyl, diphenyl and dibenzofuryl, $R_1$ is a member of the group consisting of methyl, phenyl and p-phenylene, $R_2$ is a member of the group consisting of phenyl, naphthyl and benzothiazolyl, $R_3$ is methyl, $R_4$ is benzidide, and $n$ and $p$ each represents an integer from 1 to 2.

2. The process of claim 1 wherein the nematodes are contacted with the toxicant by applying the toxicant to the roots of infested plants.

3. The process of claim 1 wherein the nematodes are contacted with the toxicant by applying the toxicant to nematode infested soil.

4. The process of claim 1 wherein the toxicant is 3-hydroxy-2-naphthanilide.

5. The process of claim 1 wherein the toxicant is 3-hydroxy-3'-nitro-2-naphthanilide.

6. The process of claim 1 wherein the toxicant is 3-hydroxy-4'-chloro-2-naphthanilide.

7. The process of claim 1 wherein the toxicant is 3-hydroxy-2',5'-dimethoxy-2-dibenzofurylanilide.

8. The process of claim 1 wherein the toxicant is 2-hydroxy-4'-chloro-3-carbazolcarboxanilide.

9. The process of claim 1 wherein the toxicant is 2-hydroxy-11H-benzo [a] carbazole-3-carbox-p-anisidide.

10. The process of claim 1 wherein the toxicant is bisacetoacetodi-o-anisidide.

11. The process of claim 1 wherein the toxicant is 3-hydroxy-2-anthra-o-toluidide.

12. The process of claim 1 wherein the toxicant is 3-hydroxy-N-(2-naphthyl)-2-naphthamide.

References Cited by the Examiner

UNITED STATES PATENTS

| 2,426,885 | 9/42 | Kilgore | 167—22 |
| 2,504,427 | 4/50 | Kilgore | 167—22 |
| 2,677,705 | 5/54 | Utzinger | 167—13 |
| 2,922,740 | 1/60 | Williams | 167—13 |
| 2,923,738 | 2/60 | Williams | 167—13 |

OTHER REFERENCES

Chem. Abs. 41 4515(g); 42 5676(d); 47 5121(c); 50 13452(h); 50 13450(b).

JULIAN S. LEVITT, *Primary Examiner.*

MORRIS O. WOLK, *Examiner.*